(12) United States Patent
Osafune

(10) Patent No.: US 6,762,895 B2
(45) Date of Patent: Jul. 13, 2004

(54) MAGNETIC DISK DRIVE AND POSITION ERROR SIGNAL GENERATION METHOD

(75) Inventor: Koji Osafune, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 493 days.

(21) Appl. No.: 09/934,653

(22) Filed: Aug. 23, 2001

(65) Prior Publication Data
US 2002/0034030 A1 Mar. 21, 2002

(30) Foreign Application Priority Data
Sep. 21, 2000 (JP) .................................. 2000-287721

(51) Int. Cl.[7] .............................................. G11B 5/09
(52) U.S. Cl. .................................... 360/46; 360/77.02
(58) Field of Search .................... 360/32, 46, 77.02, 360/77.08

(56) References Cited

U.S. PATENT DOCUMENTS 4,598,327 A * 7/1986 Jen et al. ................. 360/77.07

FOREIGN PATENT DOCUMENTS

| JP | 02166603 A | * | 6/1990 | ............ G11B/5/09 |
| JP | 04286702 A | * | 10/1992 | ............ G11B/5/09 |
| JP | 10320720 A | * | 4/1998 | ............ G11B/5/39 |
| JP | 10-340419 | | 12/1998 | |

* cited by examiner

Primary Examiner—David Hudspeth
Assistant Examiner—Dan I Davidson
(74) Attorney, Agent, or Firm—Pillsbury Winthrop LLP (57) ABSTRACT

A signal is read out from a two-layered perpendicular magnetic recording medium by a composite head formed from a single-pole perpendicular recording head and magnetoresistance effect type reproduction head. The read-out signal is amplified by a head amplifier, passed through a low-pass filter, and converted into a digital signal by an analog/digital converter. A DC restoring circuit restores a DC component removed by the head amplifier using the output signal from the analog/digital converter. An adder adds the restored DC component to the output signal from the analog/digital converter, thereby restoring the head output terminal signal. A servo demodulation circuit generates a position error signal on the basis of the restored signal.

14 Claims, 10 Drawing Sheets

MAGNETIC DISK DRIVE AND POSITION ERROR SIGNAL GENERATION METHOD

CROSS-REFERENCE TO RELATED APPLICATIONS

This application is based upon and claims the benefit of priority from the prior Japanese Patent Application No. 2000-287721, filed Sep. 21, 2000, the entire contents of which are incorporated herein by reference.

BACKGROUND OF THE INVENTION

1. Field of the Invention

The present invention relates to a magnetic disk drive having a single-pole perpendicular recording head and a perpendicular recording medium, and a position error signal generation method.

2. Description of the Related Art

Figure 1:
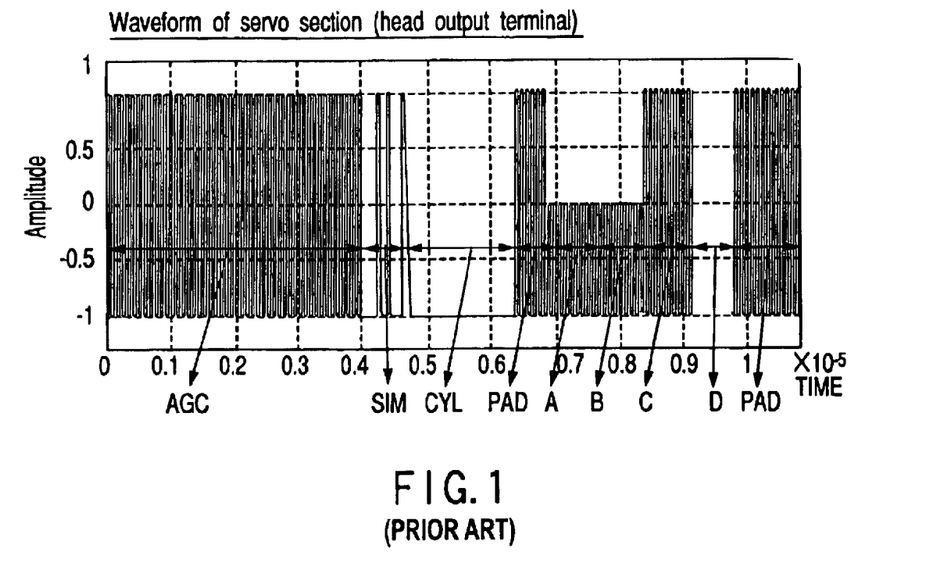
FIG. 1 is a waveform chart showing the head output terminal waveform of a servo section in a magnetic disk drive.

In recent years, magnetic disk drives employing perpendicular magnetic recording that can increase the recording density as compared to longitudinal magnetic recording are becoming popular. An example of such a magnetic disk drive employing perpendicular magnetic recording performs perpendicular magnetic recording/reproduction by combining a composite head formed from a single-pole perpendicular recording head and magnetoresistance effect type reproduction head (GMR head or the like) and a two-layered perpendicular magnetic recording medium. FIG. 1 shows the head output terminal waveform of the servo section when data perpendicularly magnetically recorded on a recording medium by this scheme is read out.

AGC shown in FIG. 1 represents a portion for amplitude gain control. An SIM portion corresponds to a servo index mark that indicates the start of servo data. A CYL portion corresponds to servo cylinder information and servo sector number information. A PAD portion corresponds to data for timing adjustment. A to D portions correspond to A to D burst signals. Since the signals are read by a head for directly detecting the magnetic field of a GMR head or the like, a signal having a signal amplitude of −1 is detected even at a portion without any magnetization reversal (CYL portion or D portion), as shown in FIG. 1 (for the descriptive convenience, the signal amplitude is normalized to ±1).

Figure 2:
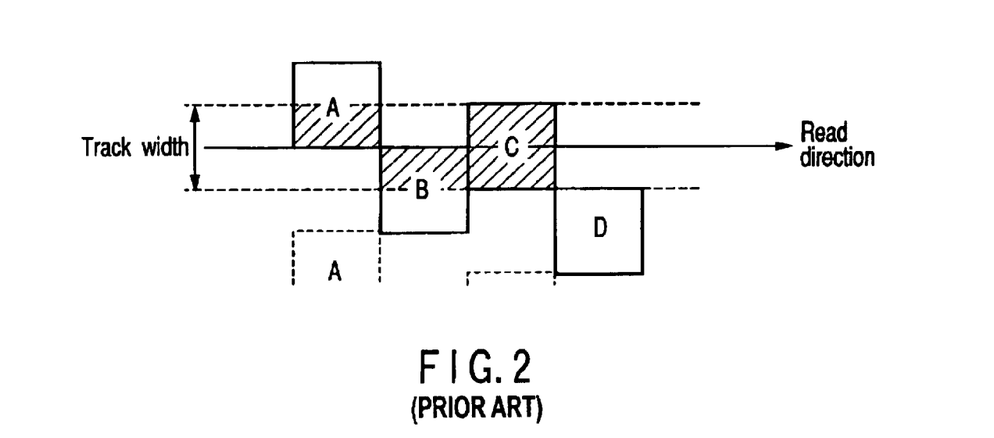
FIG. 2 is a view showing the pattern of perpendicularly recorded burst signals.

The A to D burst signals are recorded on a track as, e.g., a pattern shown in FIG. 2. In this example, the A and B burst signals are located with a ½ phase shift for the target track. The C burst signal is located on the target track without any shift. The D burst signal is located with a full phase shift from the target track. For this reason, in the head output terminal waveform shown in FIG. 1, the amplitudes of the A to D burst signals appear as −1 to 0, −1 to 0, −1 to +1, and −1, respectively.

Figure 3A:
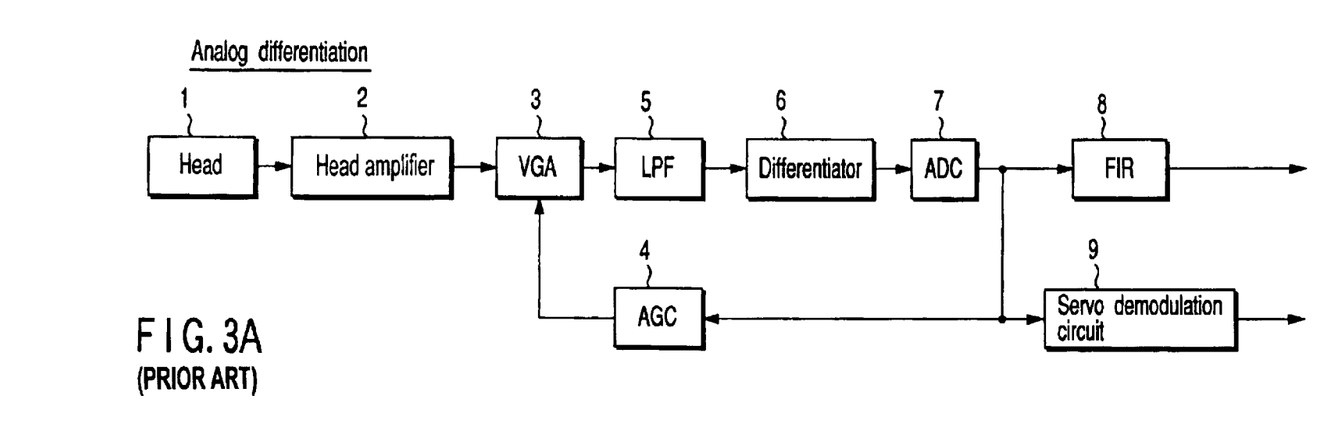
FIGS. 3A and 3B are block diagrams showing circuits for generating a positioning signal by conventional schemes.
Figure 3B:
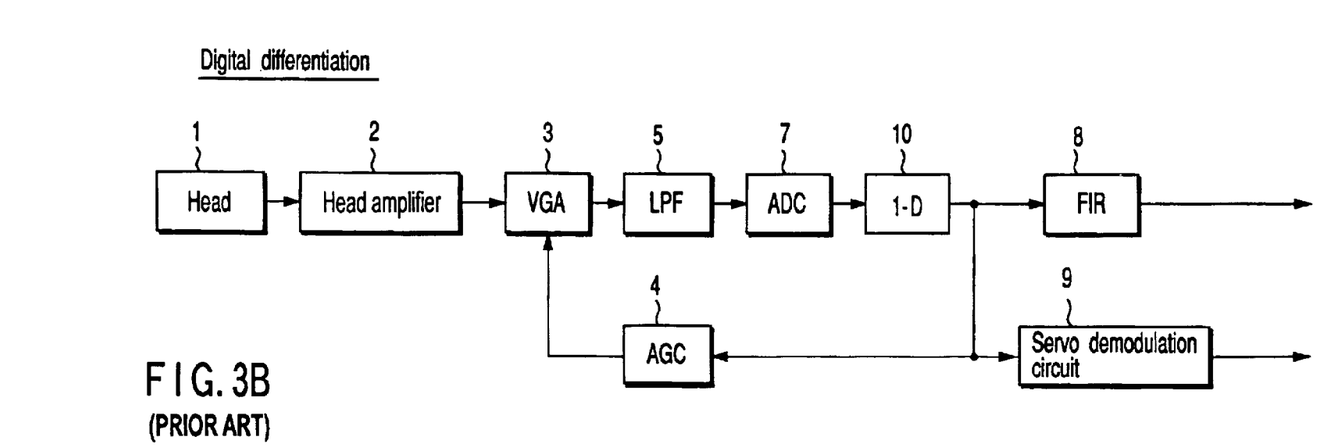

FIGS. 3A and 3B are block diagrams showing circuits for generating a positioning signal by conventional schemes. FIG. 3A shows an analog differentiation scheme, and FIG. 3B shows a digital differentiation scheme.

Referring to FIG. 3A, a head 1 is a composite head. A single-pole perpendicular recording head is employed for recording, and a GMR head is employed for reproduction. A signal read from the head 1 has the waveform shown in FIG. 1. A head amplifier (IC) 2 amplifies the signal read from the head 1. Since the low-frequency cutoff frequency of the head amplifier 2 at this time is several hundred kHz to 1 MHZ, the head amplifier 2 passes no DC (Direct Current) component, and the baseline of the waveform varies.

A variable gain amplifier (VGA) 3 determines the gain for the output signal of the head amplifier 2 in accordance with the output signal from an amplitude gain controller (AGC) 4. The AGC circuit 4 controls the variable gain amplifier 3 such that the AGC portion shown in FIG. 1 has a predetermined amplitude. A low-pass filter (LPF) 5 reduces high-frequency noise in the output signal from the variable gain amplifier 3.

A differentiator 6 executes analog differential processing for the output signal from the low-pass filter 5 so as to eliminate the variation in baseline and equalize the output waveform from the head with a servo waveform for normal planar recording. The output waveform from the differentiator 6 is the same as the servo waveform for normal planar recording.

An analog/digital converter (ADC) 7 samples the output signal from the differentiator 6. The sampling frequency is about 10 times the burst signal frequency. A finite impulse response circuit (FIR) 8 generates a reproduced signal on the basis of the output signal from the analog/digital converter 7.

A servo demodulation circuit 9 obtains the absolute value of the signal sampled by the analog/digital converter 7 and adds the signals in each burst section, thereby demodulating the burst amplitude. The signals are added in order to improve the S/N ratio of a position signal by the integration effect. From the thus obtained burst signal, a position signal is calculated by (A burst signal amplitude − B burst signal amplitude)/(A burst signal amplitude + B burst signal amplitude).

In the digital differential scheme shown in FIG. 3B, a 1-D arithmetic device 10 as a digital differentiator is arranged in place of the analog differentiator 6 shown in FIG. 3A. In this case, the 1-D arithmetic device 10 is placed on the output side of the analog/digital converter 7 to execute 1-D arithmetic operation for the output signal from the variable gain amplifier 3, thereby executing digital differential processing.

As described above, to eliminate the variation in baseline and equalize the output waveform from the head with the servo waveform for normal planar recording, in the prior arts, the output from the head amplifier is differentiated. A position error signal is generated on the basis of the differentiated signal.

However, the differential processing increases noise in the high-frequency region of the signal, degrades the S/N ratio, and increase variance of the position error signal.

BRIEF SUMMARY OF THE INVENTION

Accordingly, it is an object of the present invention to provide a magnetic disk drive and position error signal generation method which restores a head output terminal signal without a distortion without executing differential processing and thus generating a position error signal with less variance.

According to one aspect of the present invention, there is provided a magnetic disk drive comprising: a composite head formed from a single-pole perpendicular recording head which writes a signal on a perpendicular recording medium and a magnetoresistance effect type reproduction head; an amplifier which amplifies an output signal from the head; an analog/digital converter which samples the signal amplified by the amplifier; a DC component restoring circuit which restores a DC component removed by the amplifier using the signal output from the converter; a signal restoring circuit which restores the output signal from the head on the basis of the DC component restored by the DC component restoring circuit and the signal output from the converter; and a demodulation circuit which generates a position error signal on the basis of the output signal restored by the signal restoring circuit.

According to another aspect of the present invention, there is provided a position error signal generation method applied to a magnetic disk drive having a composite head formed from a single-pole perpendicular recording head which writes a signal on a perpendicular recording medium and a magnetoresistance effect type reproduction head, an amplifier which amplifies an output signal from the head, and an analog/digital converter which samples the signal amplified by the amplifier, the method comprising: restoring a DC component removed by the amplifier using the signal output from the converter; restoring the output signal from the head on the basis of the restored DC component and the signal output from the converter; and generating a position error signal on the basis of the restored output signal.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

An embodiment of the present invention will be described below with reference to the accompanying drawings.

Figure 6:
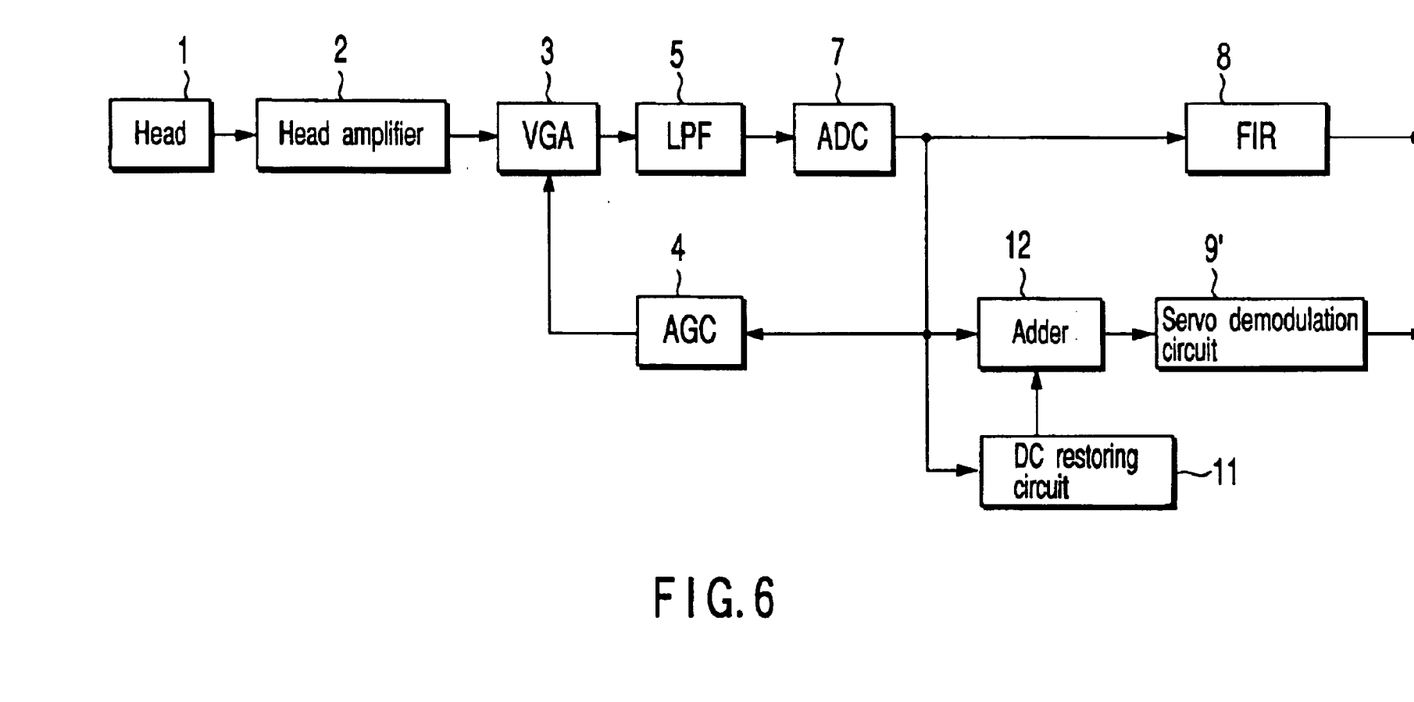
FIG. 6 is a block diagram showing a circuit for generating a positioning signal in a magnetic disk drive according to an embodiment of the present invention.

FIG. 6 is a block diagram showing a circuit for generating a positioning signal in a magnetic disk drive according to an embodiment of the present invention. The same reference numerals as in FIGS. 3A and 3B denote the same elements in FIG. 6.

Referring to FIG. 6, a head 1 is a composite head formed from a single-pole perpendicular recording head for writing a signal on a two-layered perpendicular recording medium and a magnetoresistance effect type reproduction head (GMR head). A signal read from the head 1 has the waveform shown in FIG. 1.

A head amplifier (IC) 2 amplifies the signal read from the head 1.

A variable gain amplifier (VGA) 3 determines the gain for the output signal of the head amplifier 2 in accordance with the output signal from an amplitude gain controller (AGC) 4.

The AGC circuit 4 controls the variable gain amplifier 3 such that the AGC portion shown in FIG. 1 has a predetermined amplitude.

A low-pass filter (LPF) 5 reduces high-frequency noise in the output signal from the variable gain amplifier 3.

An analog/digital converter (ADC) 7 samples the output signal from the low-pass filter 5. The sampling frequency is about 10 times the burst signal frequency.

A finite impulse response circuit (FIR) 8 generates a reproduced signal on the basis of the output signal from the analog/digital converter 7.

A DC restoring circuit 11 performs predetermined calculation using the signal sent from the analog/digital converter 7, thereby restoring the DC component removed in the head amplifier 2.

An adder 12 adds the DC component restored by the DC restoring circuit 11 to the output from the analog/digital converter 7, thereby restoring the output signal from the head 1.

A servo demodulation circuit 91 obtains a position error signal on the basis of the signal restored by the adder 12. More specifically, the servo demodulation circuit 9' obtains the DC component of each burst signal by adding digital data sampled in each burst section directly (without obtaining the absolute value), and obtains a position error signal by calculating the burst signals.

Figure 7:
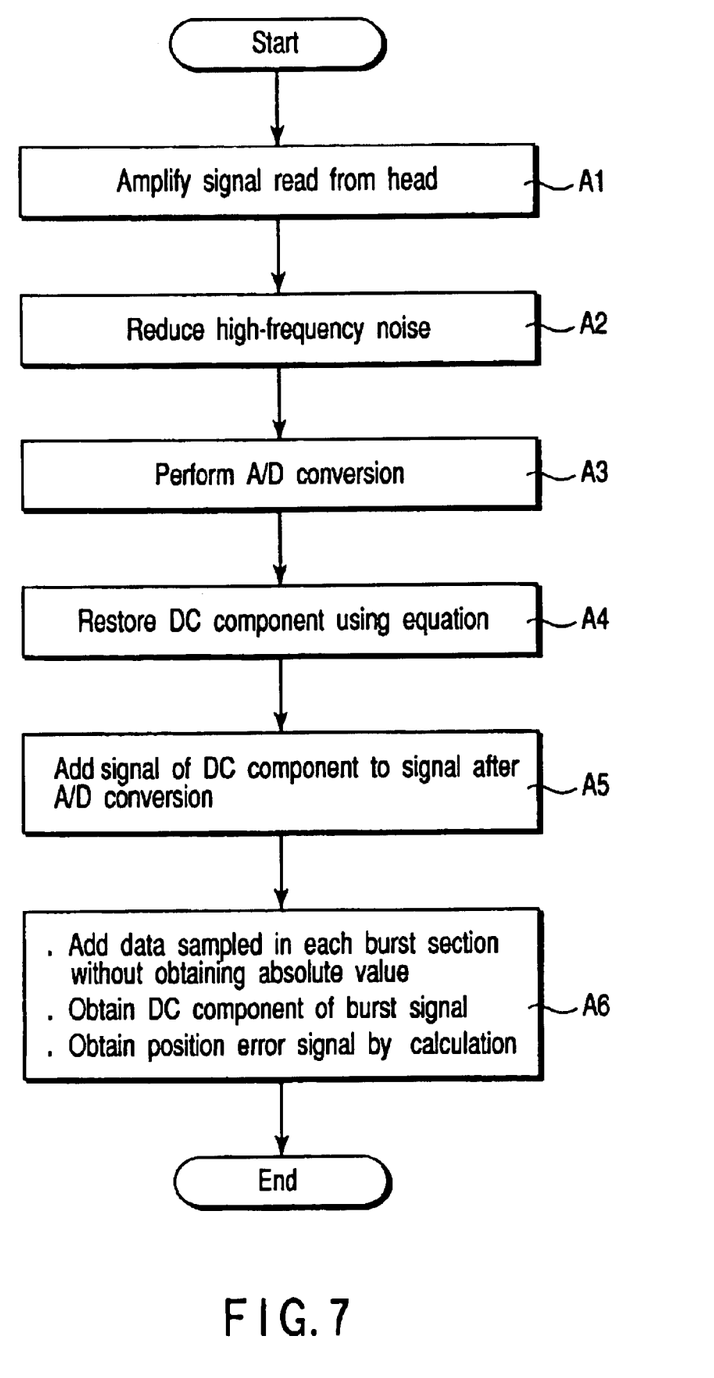
FIG. 7 is a flow chart showing the operation of the circuit shown in FIG. 6.

The operation of the circuit shown in FIG. 6 will be described below with reference to the flow chart shown in FIG. 7.

Figure 4:
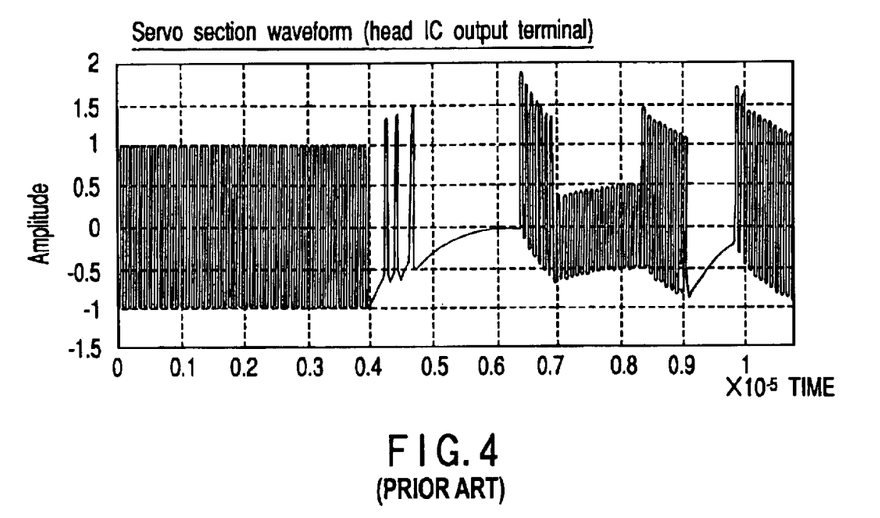
FIG. 4 is a waveform chart showing the waveform of a signal amplified by a head amplifier.

A signal read from the single-pole perpendicular recording head 1 is amplified by the head amplifier (IC) 2, as shown in FIG. 4 (step A1). Since the low-frequency cutoff frequency of the head amplifier 2 at this time is several hundred kHz to 1 MHz, the head amplifier 2 passes no DC (Direct Current) component, and the baseline of the waveform varies.

The output signal from the head amplifier 2 is amplified by a gain determined by the variable gain amplifier (VGA) 3 in accordance with the output signal from the amplitude gain control circuit (AGC) 4, and then high-frequency noise is reduced by the low-pass filter (LPF) 5 (step A2).

The output signal from the low-pass filter 5 is converted from the analog signal to a digital signal by the analog/digital converter (ADC) 7 (step A3) and sent to the finite impulse response circuit (FIR) 8, DC restoring circuit 11, and adder 12.

Figure 5:
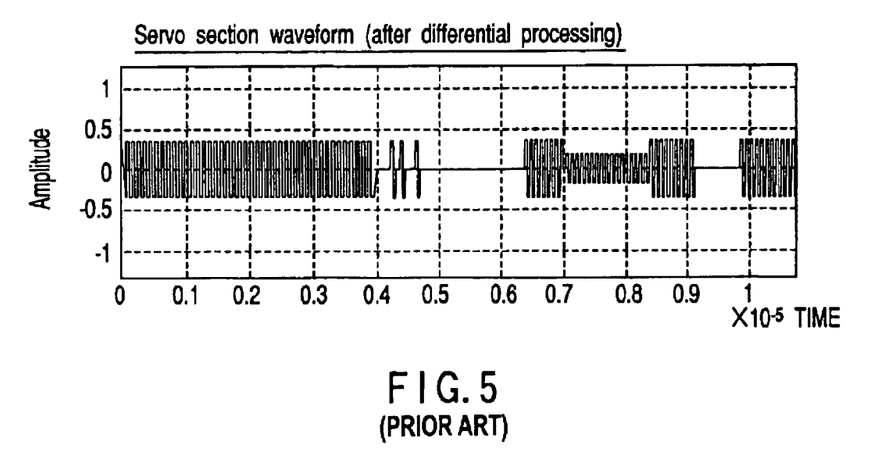
FIG. 5 is a waveform chart showing the output waveform from a differentiator used in the conventional scheme.

It is to be noted that, a conventional scheme has employed the differentiator 6 (FIG. 3A) or 1-D arithmetic device 10 (FIG. 3B) which executes differential processing for the output signal from the low-pass filter 5 so as to eliminate the variation in baseline and equalize the output waveform from the head with a servo waveform for normal planar recording, the output waveform from the differentiator 6 is the same as the servo waveform for normal planar recording, as shown in FIG. 5. Contrary to the conventional scheme, the present embodiment does not employ such differentiator and thus the waveform as in FIG. 5 is not generated.

Figure 8:
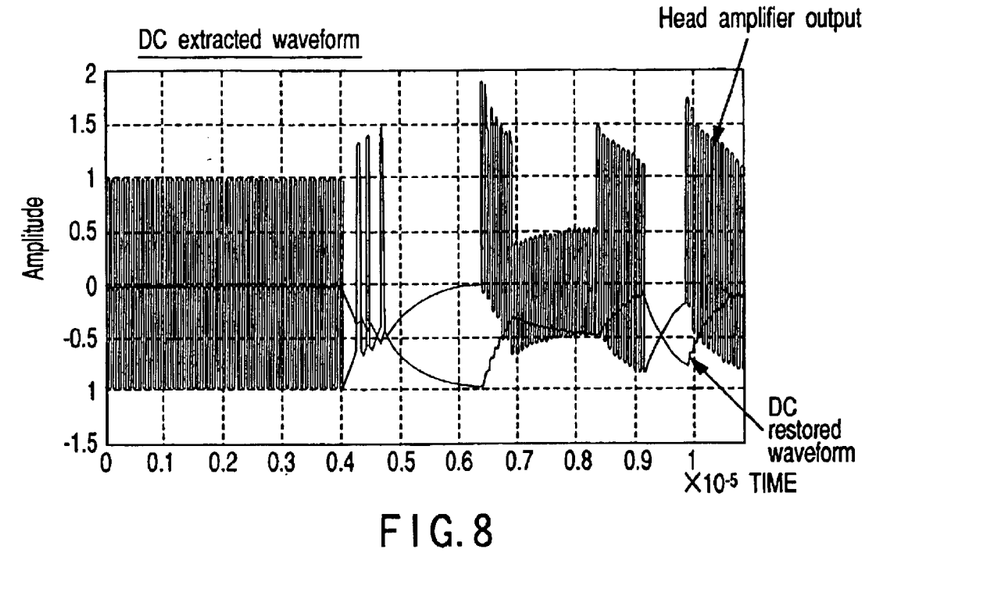
FIG. 8 is a waveform chart showing the waveform of a DC component obtained in the embodiment and a head amplifier output waveform whose DC component is removed.

The DC restoring circuit 11 executes predetermined calculation using the signal sent from the analog/digital converter 7 so as to restore the DC component (step A4). That is, letting $DCC_{(n)}$ be the restored DC waveform at time n and $D_{(n)}$ be the input signal to the DC restoring circuit 11, the DC restoring circuit 11 restores the DC component at each time by, e.g., $$DCC_{(n+1)} = DCC_{(n)} + C_i * D_{(n)} \quad (1)$$

where $C_i$ is a coefficient. By setting the coefficient $C_i$ appropriately, a DC component waveform as shown in FIG. 8 can be obtained. FIG. 8 also shows the head amplifier output waveform (same as in FIG. 4) whose DC component is removed.

To restore the DC component, not equation (1) but an equation with a larger number of terms:

$$DCC_{(n+1)} = 2*DCC_{(n)} - DCC_{(n-1)} + C_{i1}*D_{(n+1)} + C_{i2}*D_{(n)} + C_{i3}*D_{(n-1)} \quad (2)$$

may be used. By setting the coefficients $C_{i1}$, $C_{i2}$ and $C_{i3}$ appropriately, the waveform and the DC component can be more accurately obtained.

Figure 9:
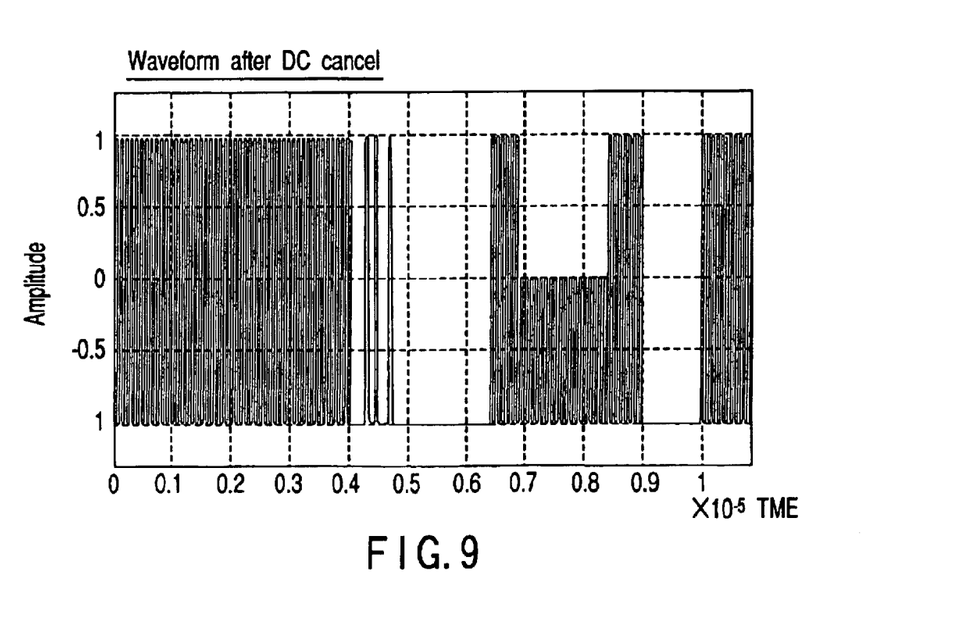
FIG. 9 is a waveform chart showing a waveform obtained by adding the DC component to the output from an analog/digital converter.

The adder 12 adds the DC component restored by the DC restoring circuit 11 to the output from the analog/digital converter 7 (step A5). With this processing, a waveform whose DC component is canceled (the variation in baseline is eliminated) and S/N ratio is high can be obtained, as shown in FIG. 9. The waveform shown in FIG. 9 is the same as the head output terminal waveform shown in FIG. 1. The restored head output terminal signal is sent to the servo demodulation circuit 9'.

In the servo demodulation circuit 9', the DC component of each burst signal is obtained by adding the digital data sampled in each burst section directly (without obtaining the absolute value), and a position error signal is obtained by calculating the burst signals (step A6).

For a perpendicularly recorded burst signal, when the head 1 is wholly located on the burst signal (corresponding to the C portion in FIGS. 1 and 2), a sinusoidal waveform with a signal amplitude of −1 to +1 is obtained. When a ½ portion of the head 1 is located on the burst signal (corresponding to the A and B portions in FIGS. 1 and 2), a waveform with a signal amplitude of −1 to 0 is obtained. When the head 1 is not located on the burst signal at all (corresponding to the D portion in FIGS. 1 and 2), a DC waveform having a signal amplitude of −1 is obtained. That is, for a perpendicularly recorded burst signal, the negative peak is −1, and the positive peak increases from −1 to +1 as the ratio of the head located on the burst signal increases. Whether the start of the amplitude is −1 to +1 depends on the magnetized state of a portion without any signal.

Figure 10:
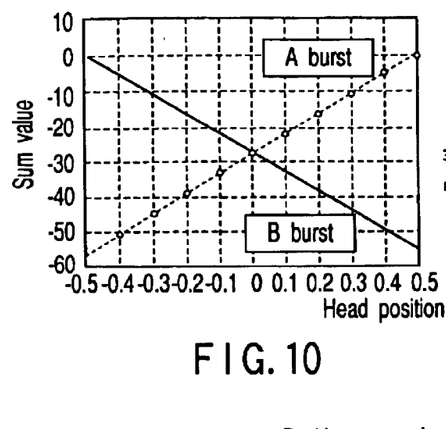
FIG. 10 is a graph showing the sum value (integrated value) of an A burst signal and the sum value (integrated value) of a B burst signal.

FIG. 10 is a graph showing the sum value (integrated value) of an A burst signal and the sum value (integrated value) of a B burst signal which are obtained at each time in the above way. Referring to FIG. 10, the abscissa represents the head position on a track. When the position is 0, the ½ portions of the head are located on the A burst signal and B burst signal, respectively. When the position is −0.5, the head is entirely located on the B burst signal. When the position is +0.5, the head is entirely located on the A burst signal.

Obtaining the integrated value (sum value) for each burst signal, as shown in FIG. 10, amounts to deriving the DC component of the signal. Referring to FIG. 10, at position "−0.5", the A burst signal is in a no signal state, and the signal amplitude is −1. When the number of times of addition is 56, the sum value is −56. At position "0", since the signal amplitude is −1 to 0, and the average value (DC component) of the signal amplitude is −0.5, the sum value is −28. At position "0.5", since the signal amplitude is −1 to +1, and the average value of the signal amplitude is 0, the sum value is 0. As described above, the sum value (DC component) of each burst signal linearly changes in accordance with the position.

Figure 11:
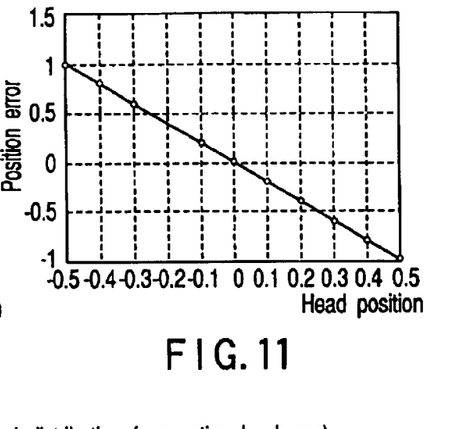
FIG. 11 is a graph showing the relationship between the head position and the position error signal.

The position error signal is obtained by position error signal=(A−B)/(A+B) using the integrated values of the respective burst signals obtained in the above-described manner. FIG. 11 is a graph showing the relationship between the head position and the position error signal. According to the processing of this embodiment, a position error signal having high linearity can be generated.

Figure 12A:
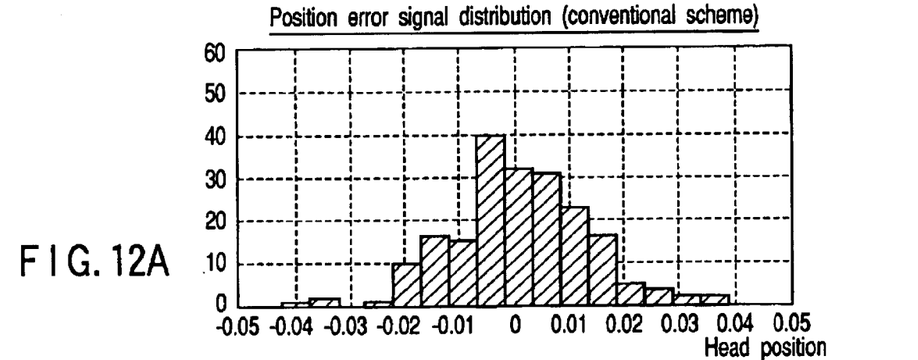
FIGS. 12A and 12B are graphs showing the comparison between the position error signal distribution with superposed noise in the conventional scheme and that of the embodiment.
Figure 12B:
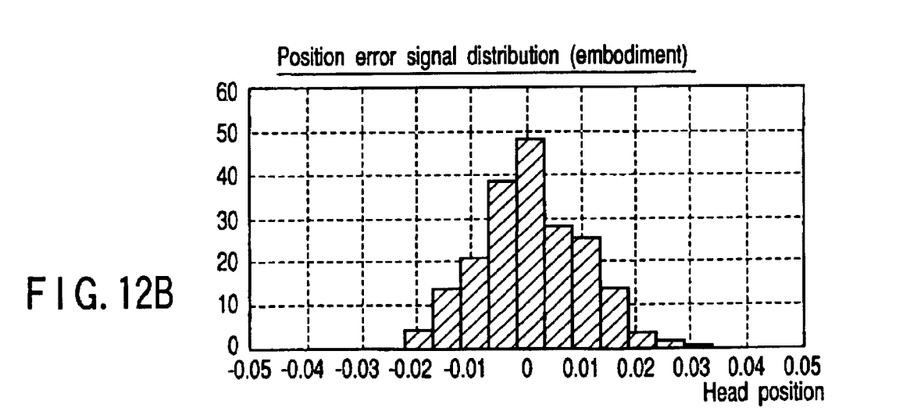

FIGS. 12A and 12B are graphs showing the comparison between the position error signal distribution with superposed noise in the prior art (differential scheme) and that of the embodiment. FIG. 12A shows the position error signal distribution by the conventional scheme, and FIG. 12B shows the position error signal distribution according to this embodiment. Referring to FIGS. 12A and 12B, the head position is 0. The variance by the conventional scheme is 0.0122, and that in this embodiment is 0.00934. This indicates that the positioning accuracy improves by about 30% in this embodiment.

Figure 13:
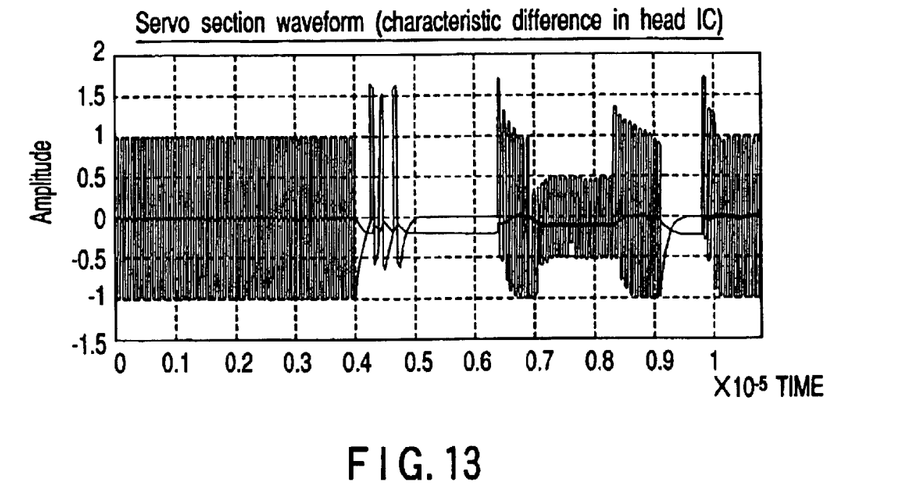
FIG. 13 is a waveform chart showing the head amplifier output waveform when the low-frequency cutoff frequency is high.
Figure 14:
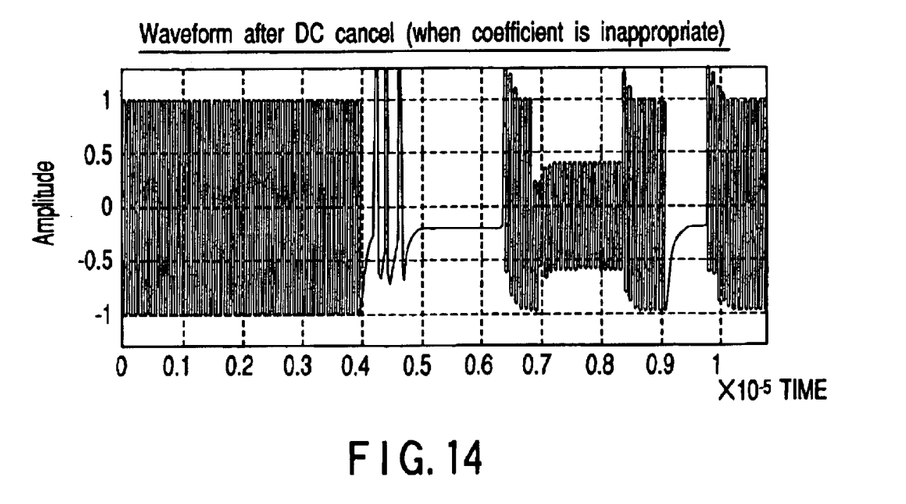
FIG. 14 is a waveform chart showing a waveform corresponding to FIG. 9 when the low-frequency cutoff frequency is high.
Figure 15:
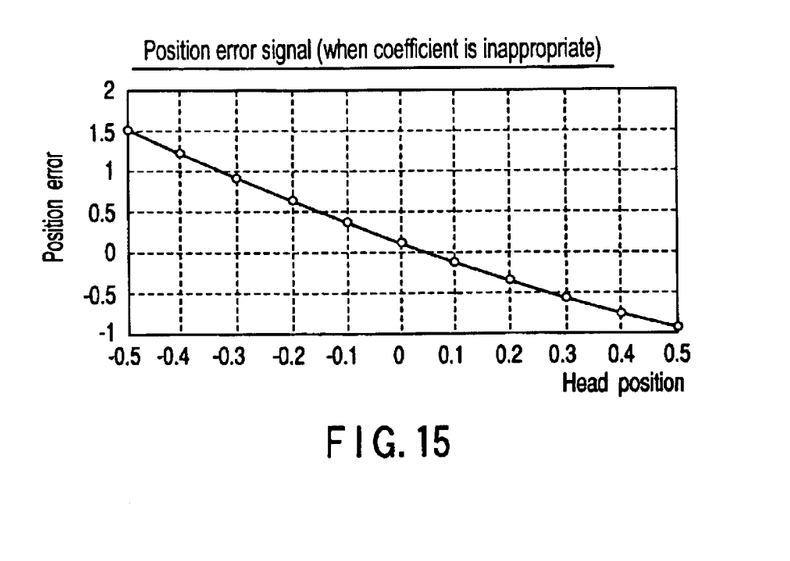
FIG. 15 is a graph showing a waveform corresponding to FIG. 11 when the low-frequency cutoff frequency is high.

As already described above, the waveform distortion due to DC component elimination shown in FIG. 4 is caused by low-frequency cutoff by the head amplifier. The coefficient $C_i$ in the DC restoring circuit 11 must be appropriately determined in accordance with the low-frequency cutoff frequency. FIG. 13 is a waveform chart showing a case when the low-frequency cutoff frequency is higher than that in FIG. 4. When the same coefficient $C_i$ is used for a head amplifier having such a characteristic, the DC component cannot be correctly canceled. In this case, not the waveform shown in FIG. 9 but a waveform shown in FIG. 14 is obtained. FIG. 15 is a graph showing a position error signal at this time. As is apparent from FIG. 15, the linearity of the position error signal is lost. For an actual device, since the low-frequency cutoff frequency of the head amplifier can be higher by almost twice, a measure against this must be taken.

Figure 16:
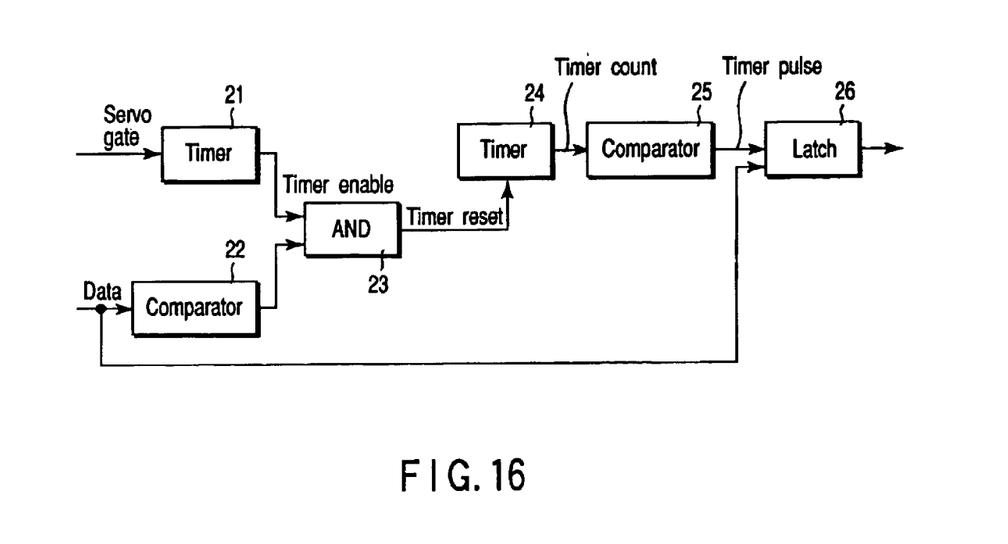
FIG. 16 is a block diagram showing a circuit arrangement for appropriately selecting and setting a coefficient in the DC restoring circuit.
Figure 17:
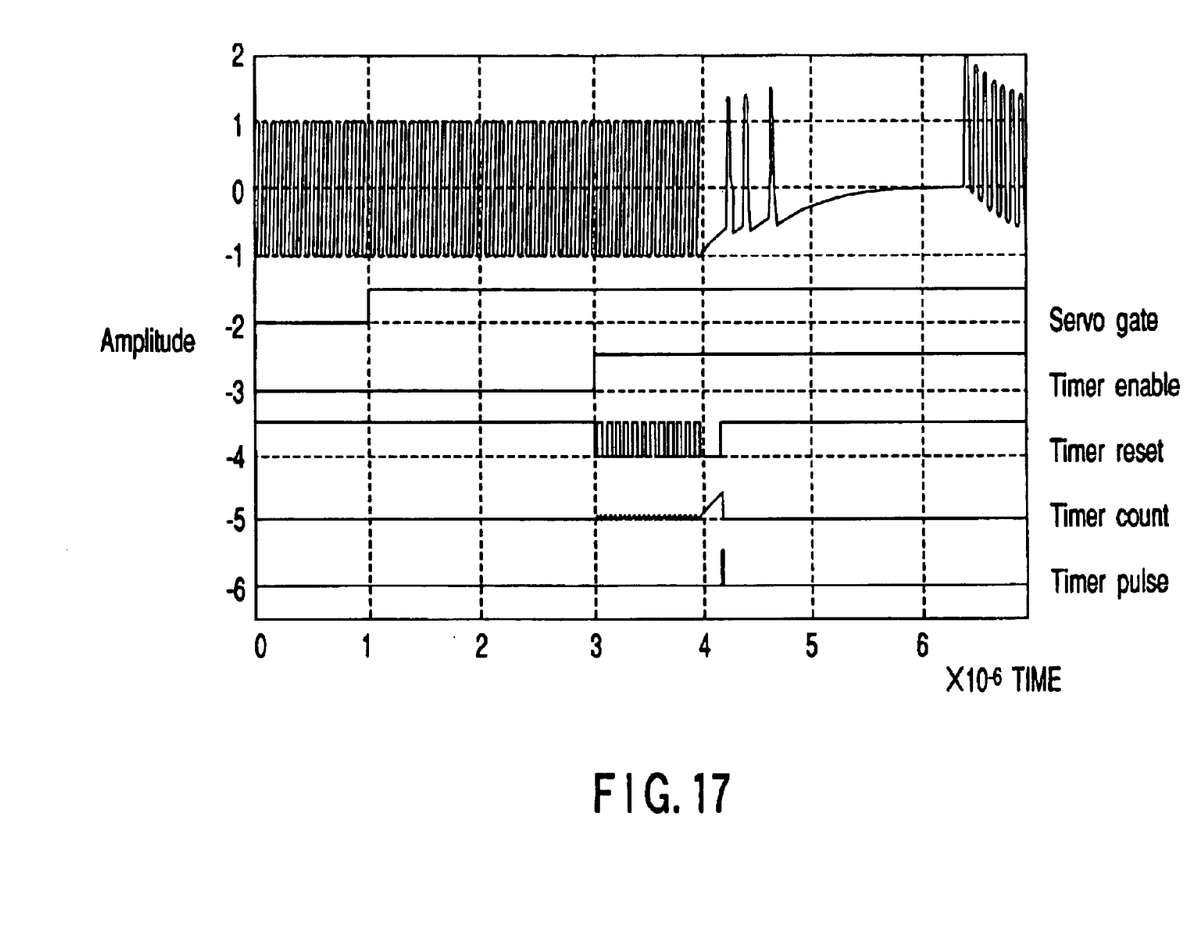
FIG. 17 is a waveform chart for explaining operation of appropriately selecting and setting a coefficient in the DC restoring circuit.

A circuit arrangement and operation for appropriately selecting and determining the coefficient $C_i$ in the DC restoring circuit 11 will be described with reference to FIGS. 16 and 17.

In the AGC portion of a signal, a servo gate signal representing a servo information area is turned on. This triggers counting by a timer 21. When a predetermined time has elapsed after the servo gate signal is turned on, a timer enable signal is turned on to start counting by a timer 24.

While the signal level is negative, the timer 24 continues counting. When the signal level is 0, a signal of level 0 is output from a comparator 22 to set a timer reset signal for an AND circuit 23 at 1, so the timer 24 is reset.

When the AGC portion of the signal is ended, and the SIM portion starts, no signal state continues for a while, and the count value of the timer 24 increases. When the count value of the timer 24 exceeds a predetermined value, a latch pulse is output from a comparator 25, and the signal level at that time is latched by a latch circuit 26.

The signal level obtained here is related to the low-frequency cutoff frequency of the head amplifier and changes depending on the low-frequency cutoff frequency. Hence, an appropriate coefficient $C_i$ can be selected and determined by referring to the latched signal level.

From the latched signal level, $C_i$ can be obtained by, e.g., $$Ci=\{\log (v/E)/t1\}*Ts \quad (3)$$

where, v is a latched signal level, E is a level of the AGC portion, t1 is a time period from an end of the AGC portion to a latch time, and a time of sampling a servo signal.

The method of obtaining equation (3) will be described below.

Assume that a transfer function for a low-frequency cutoff characteristic is expressed by s/(s+a). In this case, Ci in equation (1) for obtaining DC component waveform is expressed by $$Ci=Ts*a \quad (4)$$

A transient response characteristic of the above transfer function is expressed by $$v=E*\exp(-at) \quad (5)$$

Substituting a of equation (5) in equation (4) yields the above Equation (3).

As described above, according to this embodiment, the DC restoring circuit 11 performs predetermined calculation using the signal sent from the analog/digital converter so as to restore the DC component removed by the head amplifier 2. The adder 12 adds the DC component restored by the DC restoring circuit 11 to the output from the analog/digital converter 7. With this processing, a head output terminal signal whose DC component is canceled (the variation in baseline is eliminated) and a high S/N ratio can be obtained. In addition, the servo demodulation circuit 9' adds the digital data sampled in each burst section directly (without obtaining the absolute value) to obtain the DC component of each burst signal, and obtains a position error signal by calculating the burst signals. Hence, a position error signal with less variance can be obtained.

As has been described above in detail, according to the present invention, since the DC component removed by the head amplifier is restored, and a head output terminal signal without a distortion is restored on the basis of the DC component and head amplifier output, a position error signal with less variance can be obtained without executing differential processing.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A magnetic disk drive comprising:
   a composite head formed from a single-pole perpendicular recording head which writes a signal on a perpendicular recording medium and a magnetoresistance effect type reproduction head;
   an amplifier which amplifies an output signal from said head;
   an analog/digital converter which samples the signal amplified by said amplifier;
   a DC component restoring circuit which restores a DC component removed by said amplifier using the signal output from said converter;
   a signal restoring circuit which restores the output signal from said head on the basis of the DC component restored by said DC component restoring circuit and the signal output from said converter; and
   a demodulation circuit which generates a position error signal on the basis of the output signal restored by said signal restoring circuit.

2. The device according to claim 1, wherein said DC component restoring circuit performs calculation using a predetermined equation to derive a DC component at each time.

3. The device according to claim 2, wherein the equation is given by $$DCC_{(n+1)}=DCC_{(n)}+C_i*D_{(n)}$$

where $DCC_{(n)}$ is a restored DC waveform at time n, $D_{(n)}$ is an input signal to said DC component restoring circuit at time n, and $C_i$ is a coefficient.

4. The device according to claim 2, wherein the equation is given by $$DCC_{(n+1)}=2*DCC_{(n)}-DCC_{(n-1)}+C_{i1}*D_{(n+1)}+C_{i2}*D_{(n)}+C_{i3}*D_{(n-1)}$$

where $DCC_{(n)}$ is a restored DC waveform at time n, $D_{(n)}$ is an input signal to said DC component restoring circuit at time n, and $C_{i1}$, $C_{i2}$ and $C_{i3}$ are coefficients.

5. The device according to claim 2, wherein said DC component restoring circuit determines a coefficient to be used for the equation on the basis of a no signal portion after a signal portion for amplitude gain control which is contained in the output signal restored by said signal restoring circuit.

6. The device according to claim 1, wherein said signal restoring circuit adds the DC component restored by said DC component restoring circuit to the signal output from said converter.

7. The device according to claim 1, wherein said demodulation circuit obtains the DC component of each burst signal by adding digital data in each burst section without obtaining any absolute value, and obtains the position error signal by calculating the burst signals.

8. A position error signal generation method applied to a magnetic disk drive having a composite head formed from a single-pole perpendicular recording head which writes a signal on a perpendicular recording medium and a magnetoresistance effect type reproduction head, an amplifier which amplifies an output signal from the head, and an analog/digital converter which samples the signal amplified by the amplifier, said method comprising:

restoring a DC component removed by the amplifier using the signal output from the converter;

restoring the output signal from the head on the basis of the restored DC component and the signal output from the converter; and generating a position error signal on the basis of the restored output signal.

9. The method according to claim 8, wherein said DC component restoration comprises performing calculation using a predetermined equation to derive a DC component at each time.

10. The method according to claim 9, wherein said equation is given by $$DCC_{(n+1)}=DCC_{(n)}+C_i{}^*D_{(n)}$$

where $DCC_{(n)}$ is a restored DC waveform at time n, $D_{(n)}$ is an input signal for the DC component restoration at time n, and $C_i$ is a coefficient.

11. The method according to claim 9, wherein said equation is given by $$DCC_{(n+1)}=2\,{}^*DCC_{(n)}-DCC_{(n-1)}+C_{i1}{}^*D_{(n+1)}+C_{i2}{}^*D_{(n)}+C_{i3}{}^*D_{(n-1)}$$

where $DCC_{(n)}$ is a restored DC waveform at time n, $D_{(n)}$ is an input signal to said DC component restoring circuit at time n, and $C_{i1}$, $C_{i2}$ and $C_{i3}$ are coefficients.

12. The method according to claim 9, wherein said DC component restoration comprises determining a coefficient to be used for the equation on the basis of a no signal portion after a signal portion for amplitude gain control which is contained in the restored output signal.

13. The method according to claim 8, wherein said signal restoration comprises adding the restored DC component to the signal output from the converter.

14. The method according to claim 8, wherein said position error signal generation comprises obtaining the DC component of each burst signal by adding digital data in each burst section without obtaining any absolute value, and obtaining the position error signal by calculating the burst signals.

* * * * *